United States Patent
Batchellor et al.

(10) Patent No.: US 6,731,597 B1
(45) Date of Patent: May 4, 2004

(54) METHOD AND A SYSTEM FOR INTERCONNECTING RING NETWORKS

(75) Inventors: Robert Batchellor, West Sussex (GB); Lars Egnell, Saltsjöbaden (SE); Bengt Johansson, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/462,414

(22) PCT Filed: Jun. 4, 1998

(86) PCT No.: PCT/SE98/01064

§ 371 (c)(1),
(2), (4) Date: Apr. 28, 2000

(87) PCT Pub. No.: WO99/03231

PCT Pub. Date: Jan. 21, 1999

(30) Foreign Application Priority Data

Jul. 11, 1997 (SE) .............................................. 9702688

(51) Int. Cl.[7] .................................................. H04L 1/00
(52) U.S. Cl. ...................... 370/223; 370/225; 370/248; 370/249; 370/252; 370/258; 370/401
(58) Field of Search ................................. 370/216, 222, 370/223, 224, 225, 227, 228, 241, 248, 249, 252, 258, 401, 402, 403, 404, 405, 221

(56) References Cited

U.S. PATENT DOCUMENTS

| | | | | |
|---|---|---|---|---|
| 4,320,508 A | * | 3/1982 | Takezoe ...................... 371/22 |
| 4,577,313 A | | 3/1986 | Sy .............................. 370/88 |
| 5,113,459 A | | 5/1992 | Grasso et al. ................ 385/24 |
| 5,179,548 A | | 1/1993 | Sandesara ................. 370/16.1 |
| 5,218,604 A | * | 6/1993 | Sosnosky ................. 370/85.14 |
| 5,365,510 A | | 11/1994 | Nicholson et al. ............ 370/16 |
| 5,440,540 A | * | 8/1995 | Kremer ...................... 370/16.1 |
| 5,491,686 A | | 2/1996 | Sato ............................. 370/16 |
| 5,559,814 A | * | 9/1996 | Rolin et al. ................ 371/67.1 |
| 5,668,800 A | * | 9/1997 | Stevenson .................... 370/248 |

FOREIGN PATENT DOCUMENTS

| | | | | |
|---|---|---|---|---|
| EP | 0-677-936 A1 | 10/1995 | ............ H04J/14/02 |
| WO | WO 92/04788 | 3/1992 | ............. H04J/3/02 |

OTHER PUBLICATIONS

Annual Review of Communications, vol. 48, 1994, (Chicago, USA), G.W. Ester, "Comparison of Ring Architectures, and Their Application in the Network", pp. 955–962.
Electronic Letters, vol. 32, No. 25, Dec. 1996, B.S. Johansson et al., "A Self–Restoring Optical ADM Ring Architecture", pp. 2338–2339.
NEC Research & Development, vol. 36, No. 4, Oct. 1995, (Tokyo, Japan), Nakagawa et al., "Development of SONET 2.4 Gbps 4–Fiber Ring Network System", pp. 535–544.

* cited by examiner

*Primary Examiner*—Dang Ton
*Assistant Examiner*—Shick Hom

(57) ABSTRACT

A system and a method for maintaining operation of a signaling interconnection between a first ring network and a separate second ring network. Each ring network comprises two communication paths transmitting data in opposite directions and at least two nodes connected to both communication paths. The networks are interconnected via two adjacent gateways, which receive data from the two communication paths on one network, and transmit the data onto the other network directed away from the other gateway. Data traffic is stopped in both directions in an inactive segment on each ring network, so that a node situated on a ring network receives traffic from only one of the two gateways.

12 Claims, 13 Drawing Sheets

METHOD AND A SYSTEM FOR INTERCONNECTING RING NETWORKS

TECHNICAL FIELD OF THE INVENTION

The present invention relates to a method and a system for protecting an interconnection between ring networks.

DESCRIPTION OF RELATED ART

Wave Division Multiplexing (WDM) is a technology allowing the transmission of a number of optical signals through an optical fibre using different separated light wavelengths. In this way the information carrying capacity may be increased significantly. The capacity depends on the number of used wavelength channels and their bandwidth. The signal at each wavelength travels through the fibre irrespectively of the other signals, so that each signal represents a discrete channel with large bandwidth.

A ring communication network is made up of nodes, which are connected in tandem in a ring by a unidirectional communication path, such as an optical fibre. A node receives transmissions from an upstream node. The return traffic is transmitted downstream to the first node.

A drawback of such a network is that a break in the ring or a failure of a node would prevent any node upstream of the break/failure to communicate with any node downstream of the break. A usual solution to this problem is to in some way provide a second spare communication path parallel to the first, but in the opposite direction, see U.S. Pat. Nos. 5,365,510, 5,179,548 and EP 677,936. If communication fails somewhere on the first communication path, then the traffic is directed back on the second communication path and the wished node will thus be reached from the other side.

Another solution is to send traffic on two communication paths in opposing directions, but with a segment of the ring inactivated for data traffic, see "Electronic letters", Dec. 5th 1996, Vol.32, No 25, p 2338–2339, B. S. Johansson, C. R. Batchellor and L. Egnell: "Flexible bus: A self-restoring optical ADM ring architecture". In the case of a fault the segment is moved to the fault. It is however not described how to achieve this in practise.

If two ring networks shall communicate, there still exists a weak point, namely the node that interconnects the two ring networks. This problem is solved in an electrical version in U.S. Pat. No. 5,218,604, in that two ring networks are interconnected via two parallel serving nodes. A ring network consists, in this case, of two parallel communication paths, of which one carries traffic in the clockwise direction and the other carries the same traffic in the counterclockwise direction.

In the first ring network traffic from both communication paths are received by both of the serving nodes via a so called "drop-and-continue" property. In each of the two serving nodes a selector selects from which communication path received signals will be retransmitted.

The two serving nodes then retransmit the received signals in a second ring network. Each serving node transmits away from the other serving node, with the result that the two communication paths in the second ring network carry the same traffic. The node to which the traffic is sent uses a selector to select from which communication path signals will be received.

SUMMARY OF THE INVENTION

A purpose with the present invention is to provide a protected interconnection between ring networks. A ring network will for short be called a "ring". The protection is done by using two parallel interconnecting nodes on a ring, which are coupled with two corresponding parallel interconnecting nodes on another ring and are called gateways. Signals entering a ring are routed across both gateways. A gateway may receive signals from both directions of the ring, but only transmits away from the neighbouring gateway.

So far the invention is similar to the invention in U.S. Pat. No. 5,218,604. A problem with the invention in U.S. Pat. No. 5,218,604 is that if an optical version is done, then expensive and not reliable optical selectors for each wavelength will have to be used. Another problem is that amplified spontaneous emission (ASE) is not stopped, which leads to saturation, higher noise level and oscillations.

The present invention solves the problem by using a different kind of nodes than the nodes in U.S. Pat. No. 5,218,604 and in particularly by each ring comprising an inactive segment. The inactive segment ensures that nodes on the ring only receive signals from one of the gateways. In the event of a fault the inactive segment moves so it encompasses the fault. Hence, operation is ensured.

If the inactive segment lies between the gateways then one of the gateways features a detection mechanism that detects the situation. If the situation occurs, said gateway suppresses transmission and just the other gateway transmits.

Other differences to U.S. Pat. No. 5,218,604 is that they receive and retransmit all traffic in each node, which is not done in the present invention. Also, they have the same traffic in both rings and select from which ring to receive, but in the present invention it is possible to receive from both rings at the same time, since it is not the same traffic in both rings.

Advantages with the present invention are that a protected interconnection between ring networks are provided in a simple, autonomous and not expensive way.

In U.S. Pat. No. 5,218,604 there is also a problem of not being able to place nodes between the gateways. This is solved in an embodiment of the present invention by "dividing" the ring in an upper part and a lower part. The different parts of the ring use different wavelengths. The inactive segment is situated either in the upper or the lower part.

One of the gateways transmit always both in the upper and the lower part of the ring, using different wavelengths in the different parts, as mentioned. The other gateway transmit only in the part where the inactive segment is situated. The other gateway knows in which part of the ring to transmit and not due to the detection mechanism described above.

BRIEF DESCRIPTION OF TEE DRAWINGS

FIG. 5 illustrates a first embodiment of the gateways corresponding to FIG. 3a.

FIG. 6 illustrates a first embodiment of the gateways corresponding to FIG. 4a.

FIG. 8 illustrates a second embodiment of the gateways corresponding to FIG. 3a.

FIG. 9 illustrates a second embodiment of the gateways corresponding to FIG. 4a.

DETAILED DESCRIPTION OF PREFERRED EMBODIMENTS

Figure 1A:
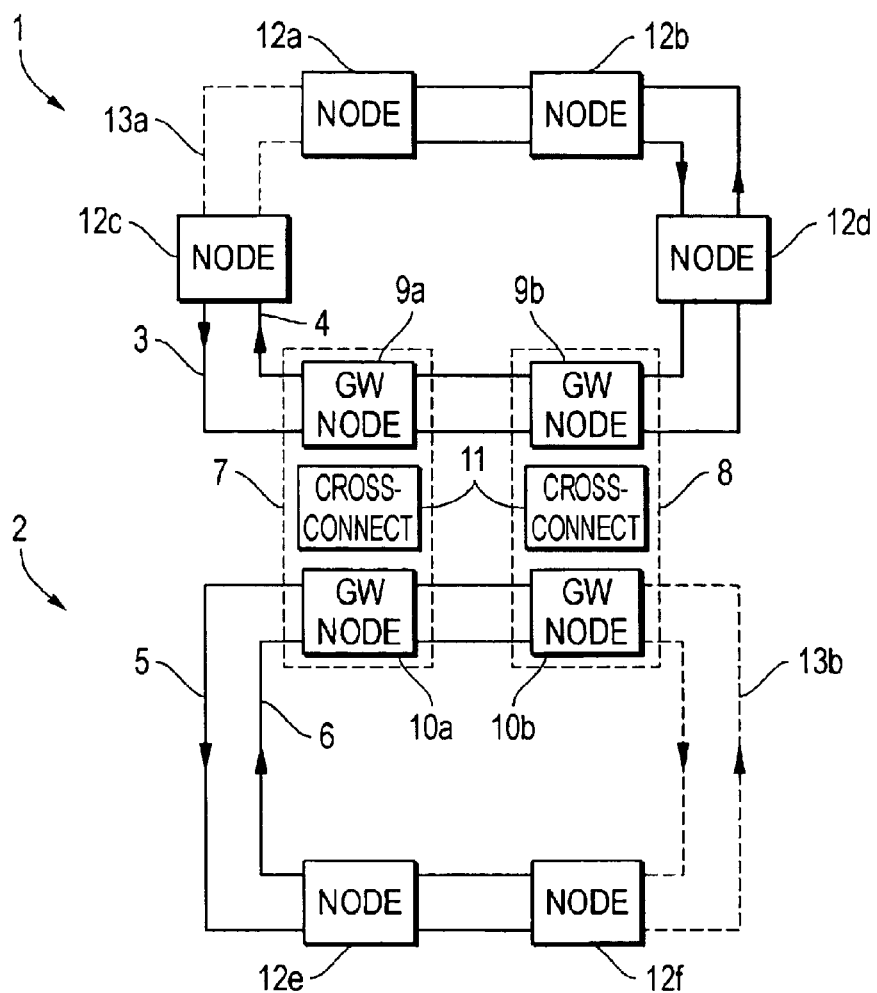
FIG. 1a is a diagram of a network in accordance with the invention with an inactive segment in one position.

In FIG. 1a is shown, according to the invention, a first ring network 1 comprising two optical fibres 3 and 4 and a second ring network 2 comprising two optical fibres 5 and 6. A ring network will for short be called a "ring". In each ring 1, 2 the two fibres 3 and 4 or 5 and 6 work in opposite directions, which is indicated with arrows in the figure.

The two rings 1 and 2 are interconnected via a first gateway 7 to the left and a second gateway 8 to the right. Each gateway 7, 8 comprises a gateway node 9a, 9b, 10a, 10b on each ring 1, 2 and optionally some kind of cross-connect 11 between the two gateway nodes 9a, 9b, 10a, 10b. On the rings 1, 2 there may then be an arbitrary number of nodes 12a–f.

The rings 1, 2 each comprises an inactive segment 13, which is shown schematically as two dashed lines in the figures. In a normal mode the inactive segment may be situated anywhere on the ring 1, 2, but in the case of a fault the inactive segment 13 will move to the fault.

The inactive segment 13 on the ring 1 is situated between the nodes 12a and 12c, which thus become end nodes of a bus. The inactive segment 13 has arisen, because the two end nodes 12a and 12c both block reception from or transmission towards the place of the wished inactive segment. Examples regarding how to implement inactive segments will be given below.

Figure 1B:
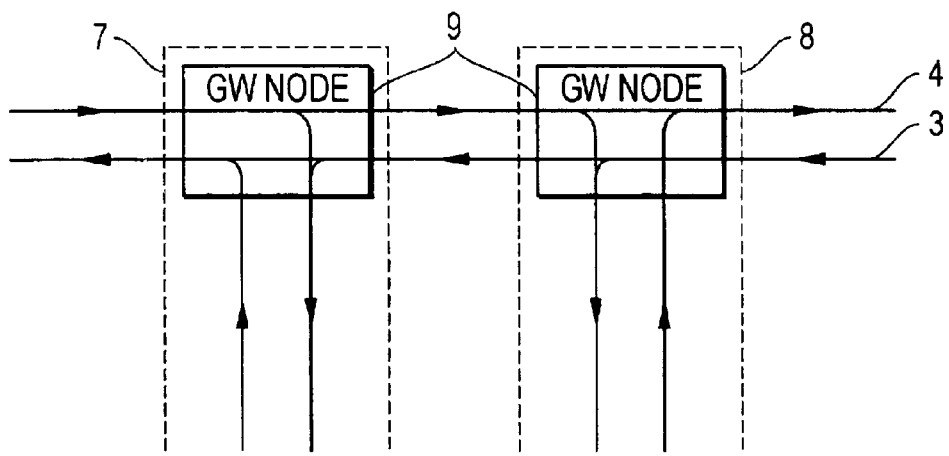
FIG. 1b is a close view of two gateway nodes.

Each gateway 7, 8 receives traffic from both directions, that is both fibres 3 and 4 or 5 and 6 in the ring 1 or 2. But, as a basic rule, the gateway 7, 8 only transmits away from its partner gateway 8, 7, which is shown in FIG. 1b. Hence, no nodes 12a–f should, in this first embodiment, lie on the direct path between the two gateways 7, 8.

The introduction of the inactive segment 13 ensures that each node 12a–f only receives traffic from one of the gateways 7, 8. The nodes 12c that are situated counterclockwise from the inactive segment 13 will receive traffic from the left gateway 7, whereas the nodes 12a, 12b, 12d that are situated clockwise from the inactive segment 13 will receive traffic from the right gateway 8.

As an example let us say that the node 12f below to the right in the lower ring 2 wants to transmit to the left upper node 12a in the upper ring 1. Transmission will in the lower ring 2 start in the node 12f and follow fibre 6 clockwise, since there is the inactive segment 13b in the counterclockwise direction.

The transmission will pass the node 12e and reach the left gateway 7, where it is splitted. One part of the transmission is received in the left gateway 7 for retransmission in the upper ring 1 and the other part continues to the right gateway 8, where it is also received for retransmission in the upper ring 1.

The left gateway 7 retransmits in the upper ring 1 away from the right gateway 8, that is following the fibre 4 clockwise. The transmission then passes the node 12c and then—there is a stop, because the inactive segment 13a is situated between the nodes 12a and 12c, which are thus acting as end nodes in the ring.

On the other hand the right gateway 8 retransmits in the upper ring 1 away from the left gateway 7, that is following the fibre 3 counterclockwise. The transmission then passes the nodes 12d and 12b and ends up in the wished node 12a.

Figure 2:
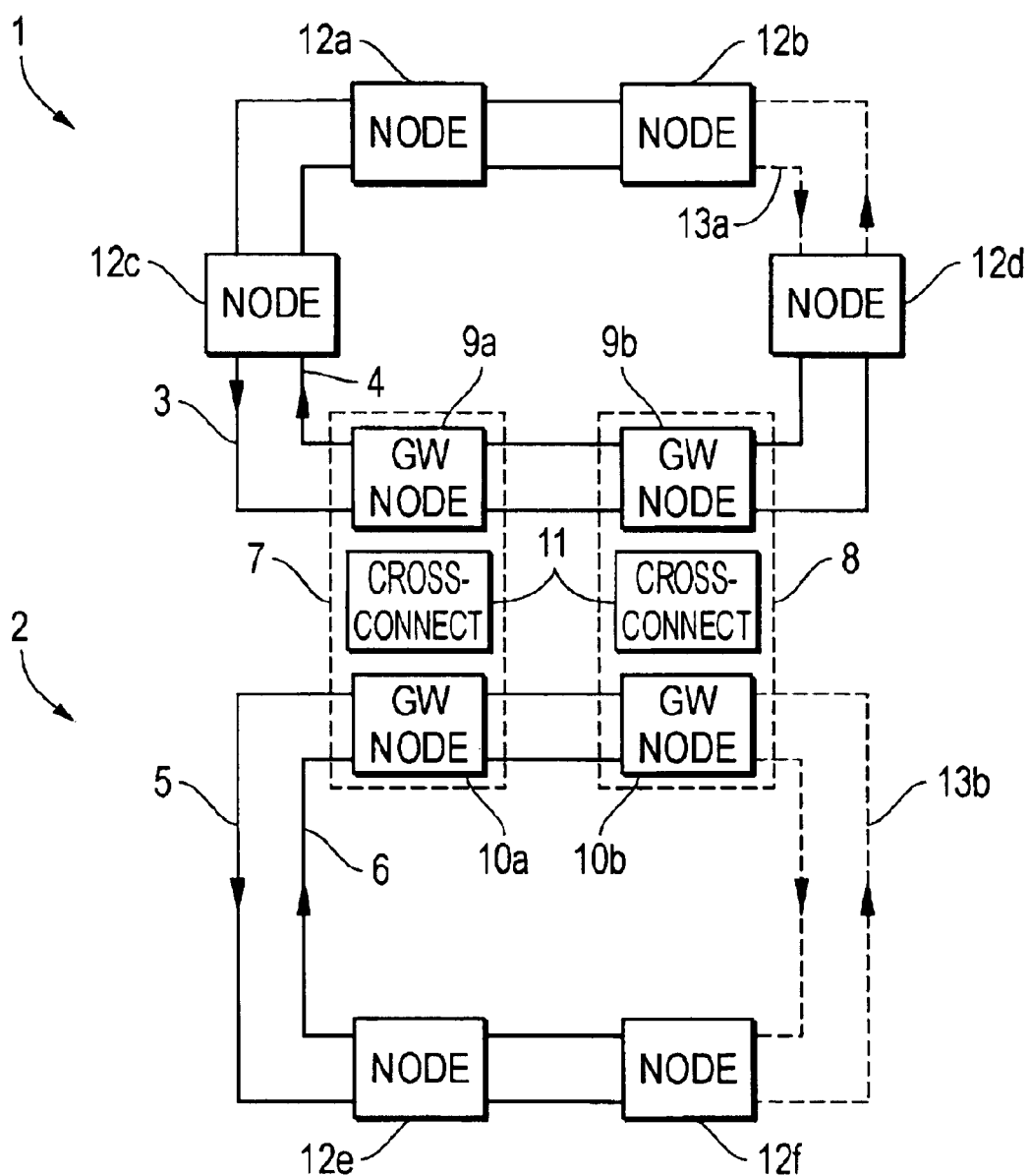
FIG. 2 illustrates the same network as in FIG. 1a, but with the inactive segment in another position.

If the inactive segment 13a had been situated between the nodes 12b and 12d instead, like in FIG. 2, it would instead have been the transmission from the left gateway 7 that had reached the wished node 12a—via the node 12c.

It is possible to obtain inactive segments in different ways. Two solutions will be presented.

Figure 3A:
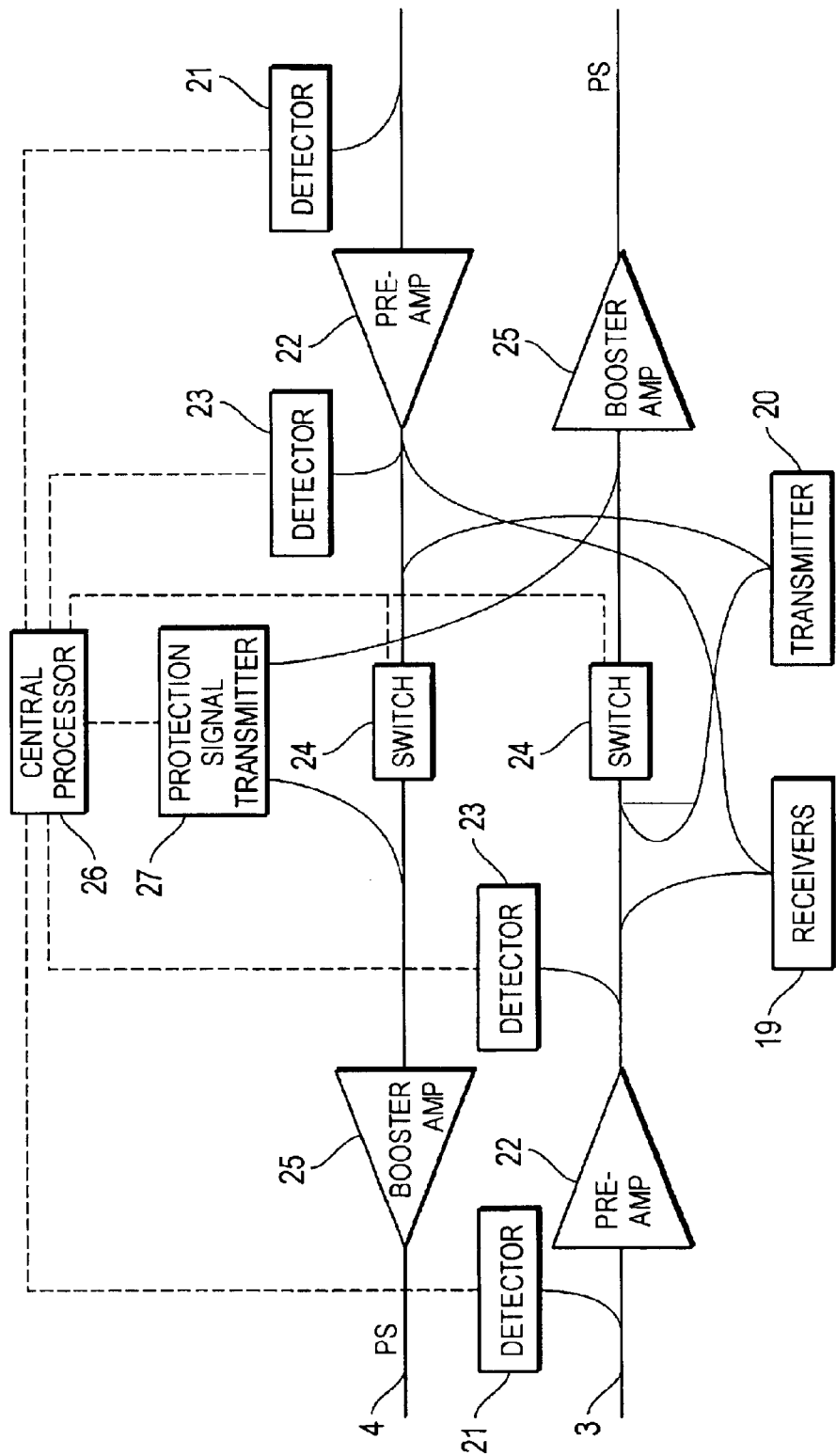
FIG. 3a illustrates one embodiment of a node according to the invention.

In order to explain how an inactive segment is achieved the parts of a node that are relevant for the invention are shown in FIG. 3a.

The node is connected to the two fibres 3, 4. On each fibre 3, 4 the node comprises a first detector 21, a preamplifier 22, a second detector 23, a switch 24, a booster amplifier 25, a group of receivers 19 and a group of transmitters 20. Normally, there is one receiver/transmitter per channel, but, the groups of receivers 19 and transmitters 20 will for simplicity consequently be drawn as one block each. The amplifiers 22 and 25 are not necessary for the invention as such, but it is conceivable that they could work as switches and replace or complement the switch 24.

The first detector 21 detects loss of incoming power and the second detector 23 detects loss of incoming protection signals. The switch 24 is used to get an inactive segment. The transmitters 20 and the receivers 19 are used to add and drop channels to and from the ring.

A central processor 26 controls everything and a protection signal transmitter 27 sends a protection signal PS on both the fibres 3, 4, that is in both directions, when the node acts as an end node.

Figure 3B:
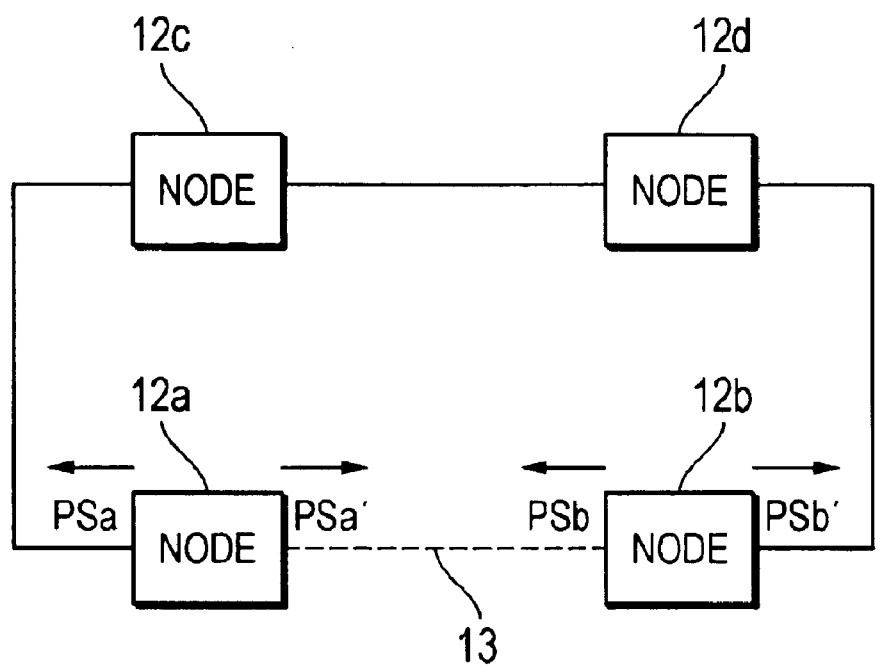
FIG. 3b is a principle diagram of the first node embodiment.

In FIG. 3b is schematically shown a ring with four nodes 12a, 12b, 12c, 12d as in FIG. 3a. An inactive segment 13 lies between the end nodes 12a and 12b. The end nodes 12a and 12b both have their switch 24 towards the inactive segment 13 closed. That means that, as a main rule, no data traffic can be transmitted over the inactive segment 13.

However, both end nodes 12a, 12b transmit protection signals PSa and PSb, respectively, in both directions, that is also over the inactive segment 13. To facilitate the description we need to distinguish the protection signals going in different directions. For that reason the protection signals PSa and PSb transmitted counterclockwise are labelled PSa' and PSb'.

As may be seen in FIG. 3a the transmission of the protection signal PS occurs after the switch 24 and is thus not influenced of the state of the switch 24. This means that in a normal state each node 12a, 12b, 12c, 12d will receive four protection signals PSa, PSb, PSa' and PSb'.

A lot of conclusions may be drawn from the reception or non-reception of the protection signals PSa, PSb, PSa' and PSb'. Some examples will be given. Further examples are easily imagined. If the left end node 12a does not receive its own protection signal PSa', but receives the protection signals PSb, PSb' from the right end node 12b, then there is probably a fault on the fibre going over the inactive segment 13 from the left end node 12a to the right end node 12b.

If the left end node 12a receives its own protection signal PSa' and the protection signal PSb' from the right end node 12b, but does not receive the protection signal PSb from the right end node 12b, then there is probably a fault on the fibre going over the inactive segment 13 from the right end node 12b to the left end node 12a.

If the left end node 12a does not receive its own protection signal PSa' and not receives the protection signal PSb' from the right end node 12b, but receives the protection signal PSb from the right end node 12b, then there is probably a fault on the fibre but not in the inactive segment 13. This is an indication on that the inactive segment 13 should be moved.

If the left end node 12a receives its own protection signal Psa', but not receives the protection signal PSb' from the right end node 12b, then there is probably a fault in the right end node 12b, but not in the inactive segment 13 and thus the inactive segment 13 should be moved.

If there is an indication that the inactive segment 13 should be moved and there is not a fault in the inactive segment, then the end nodes 12a, 12b will stop sending their protection signals PSa, PSa', PSb, PSb' and open their switches towards the inactive segment 13. Thus transmission is possible over the now former inactive segment 13.

Simultaneously, if the node 12c detects loss of incoming power by means of its first detector 21 on one side it is an indication of a fault on that side. Therefore the switch 24 on the fibre going towards that side closes and protection signals PSc starts to be transmitted in both directions. The corresponding will happen on the other side of the fault and thus a new inactive segment is created.

A fault occurring in a node instead of between two nodes may be taken care of in a corresponding way.

Figure 4A:
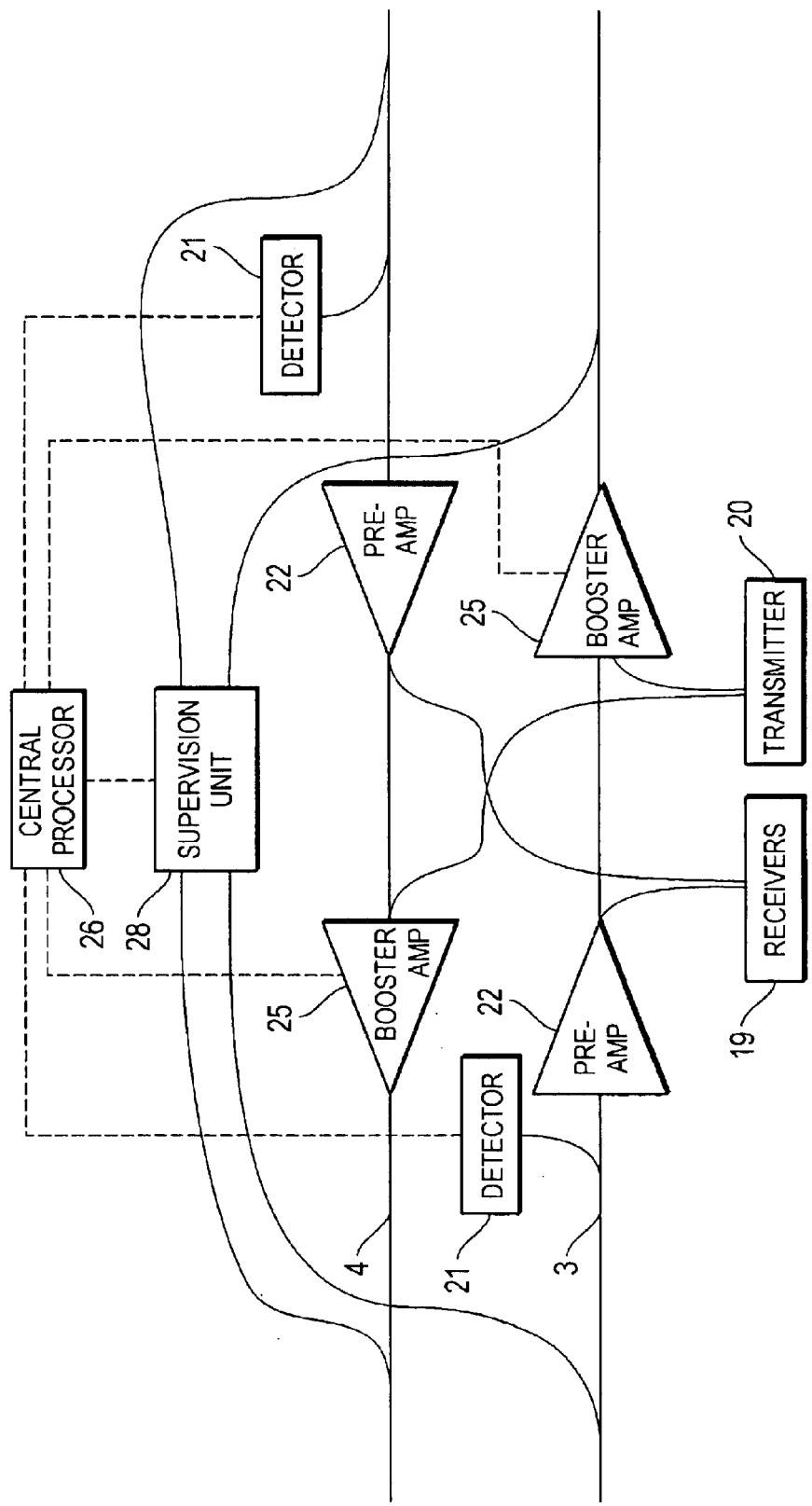
FIG. 4a illustrates another embodiment of a node according to the invention.
Figure 4B:
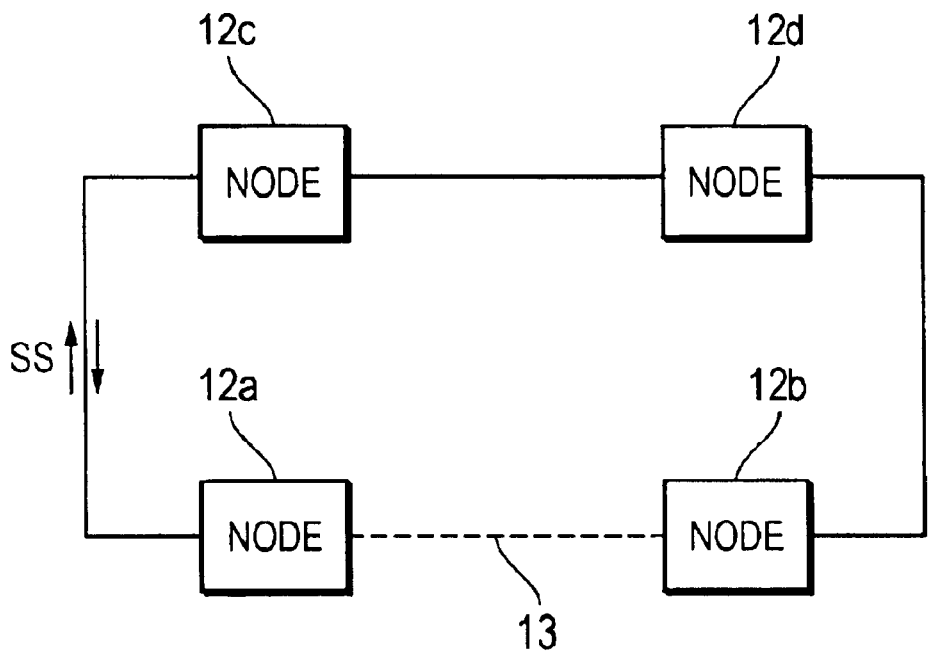
FIG. 4b is a principle diagram of the second node embodiment.

Now a second embodiment of obtaining inactive segments will be explained. In FIG. 4a are shown the parts of a node that are relevant for the invention. Much is the same as in the first embodiment and only the differences will be marked.

The node is connected to the two fibres 3, 4. On each fibre 3, 4 the node comprises the detector 21, the preamplifier 22, the booster amplifier 25, the receivers 19 and the transmitters 20.

The detector 21 detects loss of incoming power and the preamplifier 22 works as a switch. The central processor 26 controls everything and a supervision unit 28 sends an alarm signal SS on both fibres 3, 4 in a separate wavelength channel. The alarm signal SS is sent circling around the ring from node to node in both directions all the time. The alarm signal SS is a fault flag, which is set in the case of a fault. In that case there is also an indication in the wavelength channel on which section is inactive.

In a non faulty state the inactive segment is achieved by shut off preamplifiers blocking reception in the end nodes from the inactive segment. As an alternative it is conceivable to use the booster amplifiers to block transmission instead of using the preamplifiers to block reception. There are, however, advantages of blocking reception, because then signals are present at the input of the shut off preamplifier. This means that a fault occurring in the present inactive segment may be detected by loss of power. It also means that the signals may be used to adjust the future amplification of the preamplifier, so that when the preamplifier is turned on it will have the correct amplification at once.

Conventional switches may be used also in this embodiment. It is, however, more economic and more reliable to use the amplifiers as switches, since then fewer items are necessary.

If a node detects loss of incoming power, then both the preamplifier and the booster amplifier in the direction towards the fault will shut off like a switch. One reason for shutting off also the booster amplifiers is for ensuring a segment deactivation in the case of unidirectional faults. Another reason is for human eye safety reasons.

Thus, said node becomes an end node and a new inactive segment will be created much like the process in the first embodiment. However, in this case also the alarm signal SS will be set in the supervision channel.

The node on the other side of the fault will also try to set the same alarm signal SS, which gives a redundancy in case of node faults.

When the other nodes receive the set alarm signal SS they will know that a fault has occurred. The former end nodes, which had their preamplifiers shut off towards the inactive segment will now activate their preamplifiers. Thus, the inactive segment is moved, much in the same way as in the first embodiment.

The set alarm signal SS will also prevent the inactive segment to move a second time before the fault has been repaired, because moving is only allowed if the alarm signal SS is not set.

Of course, the supervision channel may also perform other types of signalling at the same time.

Figure 5:
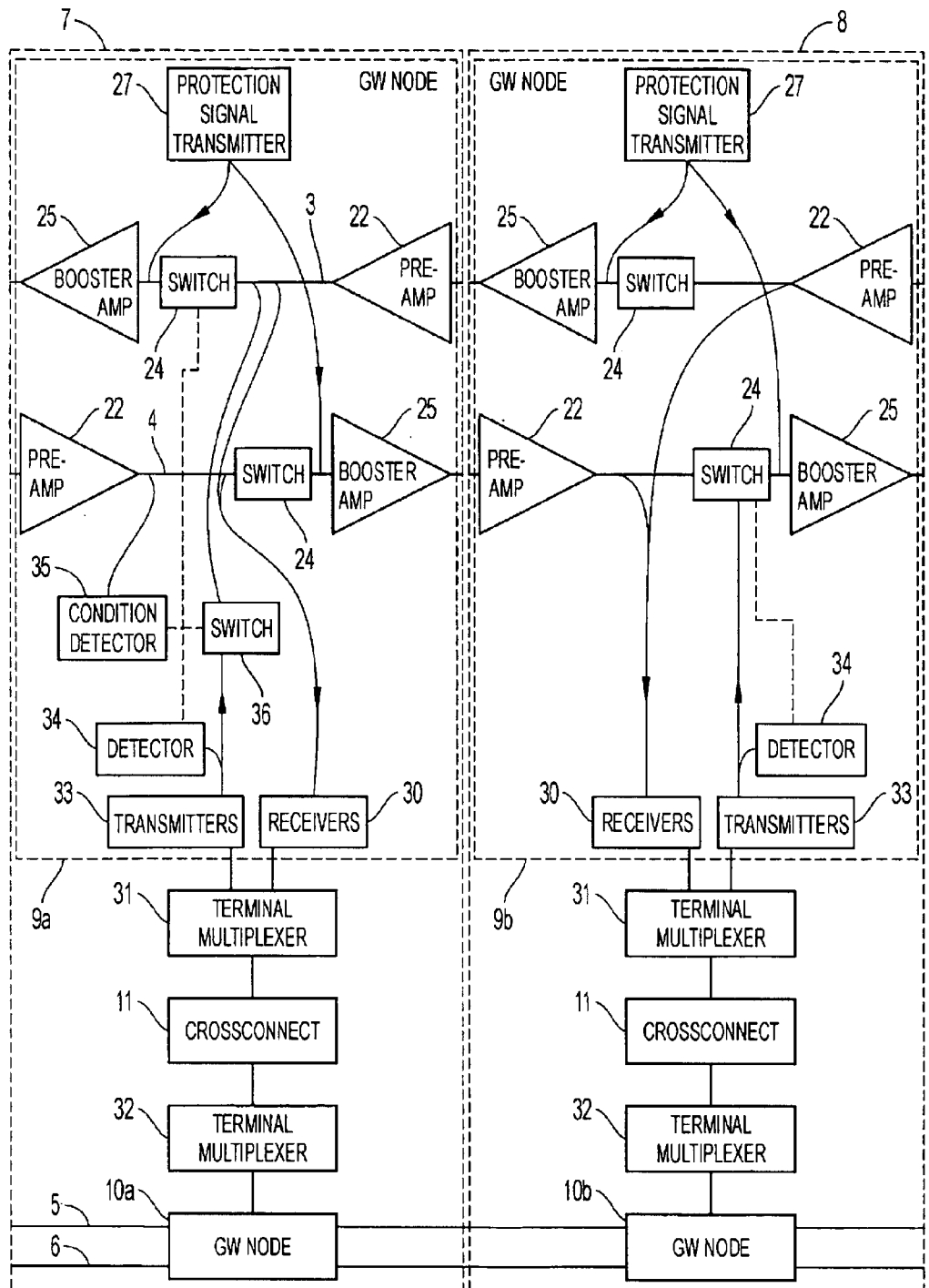
Figure 6:
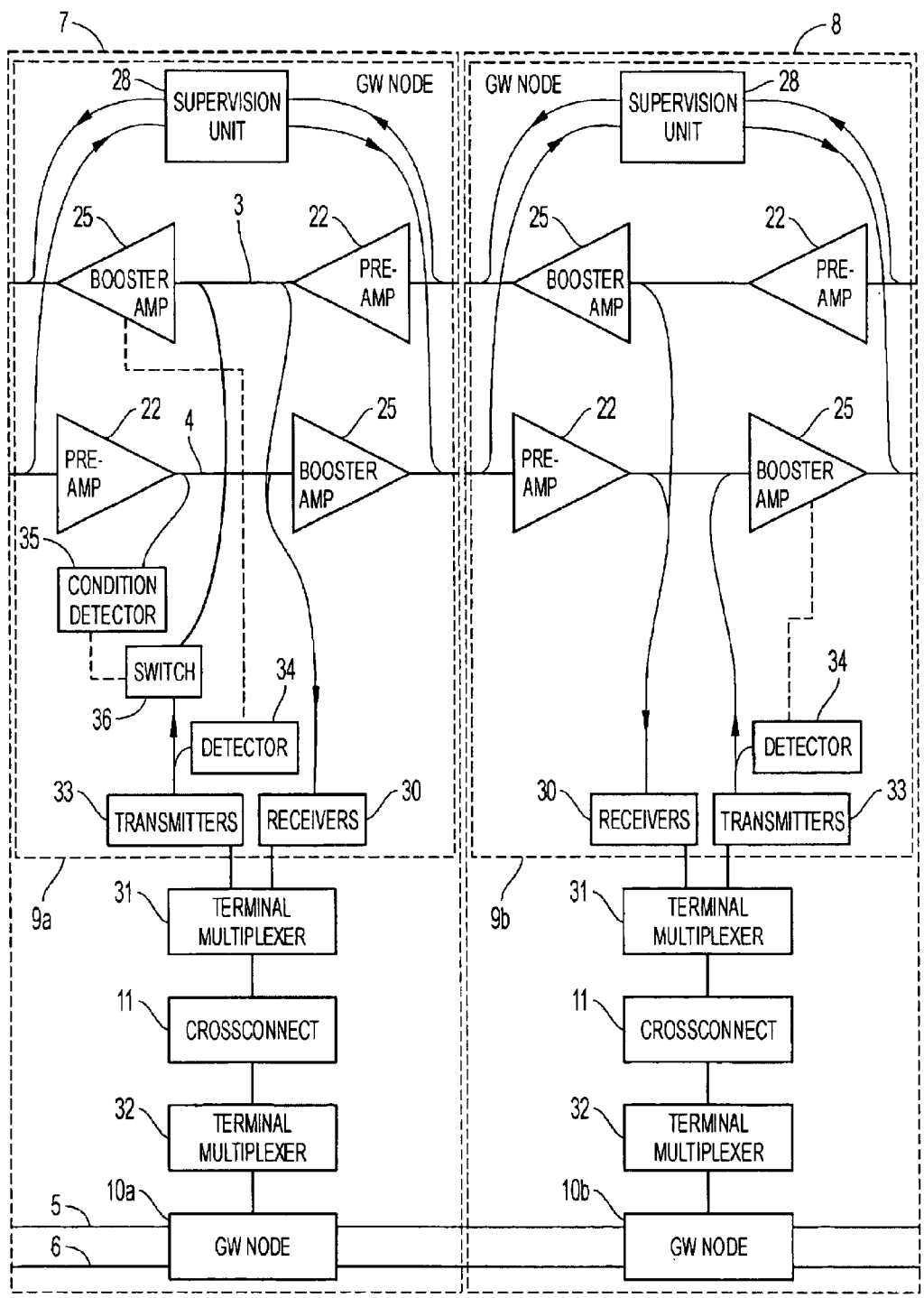

In FIG. 5 a pair of gateways nodes 9a, 9b are shown. They contain all the features of the nodes in FIG. 3a but with some extra features. For the sake of clarity only the most relevant features will be shown in FIG. 5. The extra features may also be implemented in FIG. 4a, but using the preamplifier instead of the switch, see FIG. 6. Only FIG. 5 will be described. FIG. 6 will work in a corresponding way.

The dashed lines indicating control are in these and the following figures only meant as schematic indications on which elements that belong together. Of course, the control signals goes normally via the not shown central processor, compare FIGS. 3a and 4a.

Referring to FIG. 1, the gateway 7, 8 comprises the two gateway nodes 9a, 10a, 9b, 10b with the optional crossconnect 11 between the gateway nodes 9a, 10a. In FIGS. 5 only one of the gateway nodes 9a, 9b is shown. The other gateway node 10a, 10b is similar.

Without the crossconnect 11 the transmission routes are fixed once for all, but with the crossconnect 11 they are possible to change.

In FIG. 5 the first gateway node 9a, 9b in the gateway 7, 8 are connected to both the clockwise fibre 4 and the counterclockwise fibre 3. Traffic from the first fibres 3, 4 towards the two second fibres 5, 6 in another ring, is received in receivers 30. The traffic then goes via a first terminal multiplexer 31, the optional crossconnect 11, and a second terminal multiplexer 32 to the second gateway node 10a, 10b, which is connected to the two second fibres 5, 6.

Traffic from the second gateway node 10a, 10b to the first gateway node 9a, 9b goes in the opposite direction and is retransmitted in the first fibres 3, 4 by transmitters 33 in the first gateway node 9a, 9b.

A third detector 34, or a group of detectors 34, one per channel, detects if there is a loss of incoming power from the second terminal multiplexer 32, which indicates a fault and closes the switch 24. The fault handling described above occurs.

As was explained earlier the gateway nodes 9a, 9b, 10a, 10b always receive traffic from both fibres in the same ring, but only transmit away from its neighbouring gateway node.

Together with the inactive segment this ensures that a node in a ring only receives traffic from one of the gateways.

Figure 7:
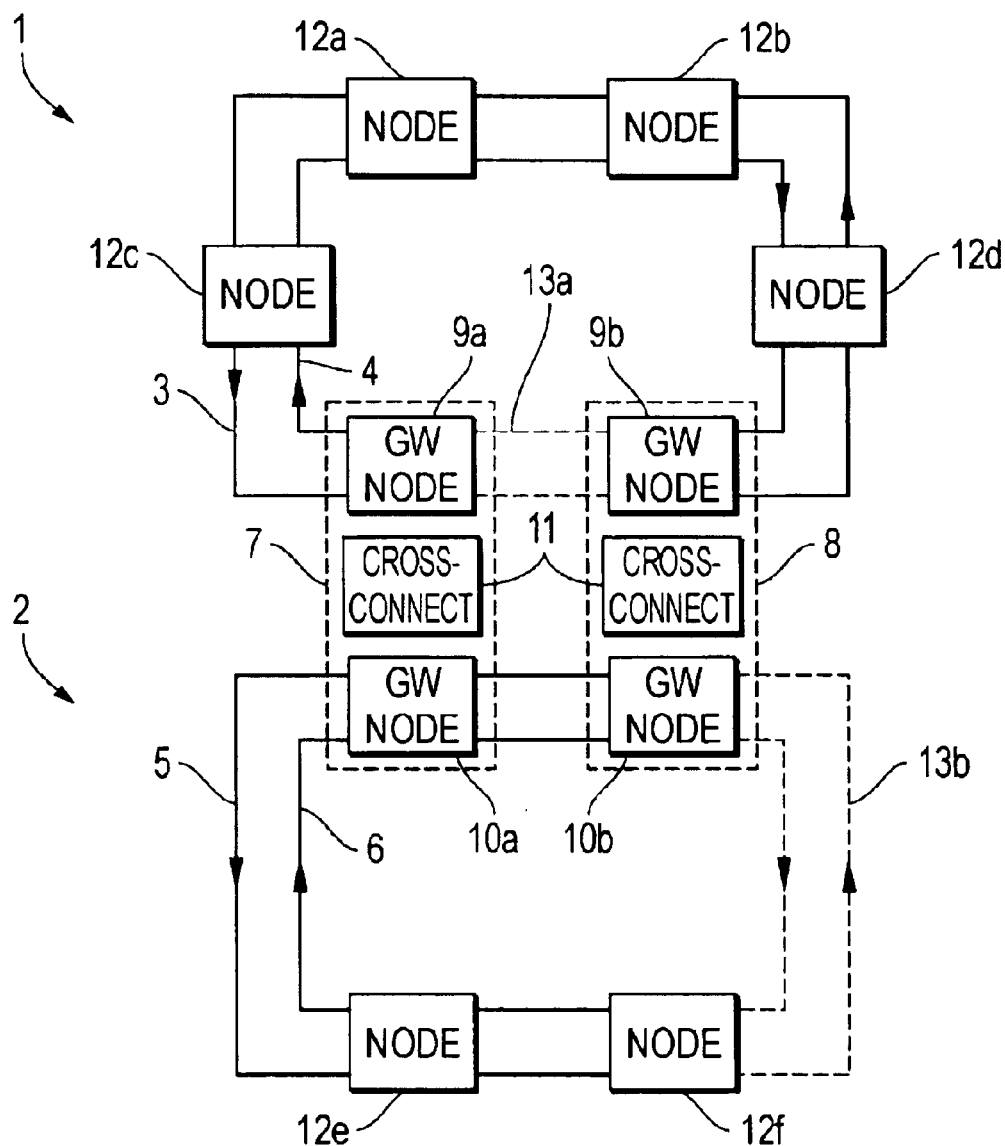
FIG. 7 illustrates the same network as in FIG. 1a, but with the inactive segment in another position.

But what happens, see FIG. 7, if the fault occurs between the two gateways 7 and 8? In this case the ring will reconfigure such that the gateways 7 and 8 form the end nodes of the ring 1. In that case all nodes 12a –d will receive traffic from both directions, which is not wanted.

That problem is however easily remediable by making the two gateways 7, 8 differing in one aspect. In this example the left gateway 7 in FIG. 5 comprises a condition detector 35, which may be the same as the second detector 23 not facing the right gateway 8. If the condition detector 35 detects a protection signal PS from the right gateway 8, the left gateway 7 suppresses transmission in the ring 1 in question by closing a switch 36. However, the left gateway 7 continues to receive traffic as usual and will stand-by for transmission. In the case of a subsequent failure in the right gateway 8, the left gateway 7 will detect that the protection signal PS is missing and will start transmitting again.

In the second embodiment in FIG. 6 information is sent in the supervision channel on in which segment the fault has occurred, which may be detected by the supervision unit 28 in the left gateway.

The possibility of detecting the case when the inactive segment is positioned between the gateway nodes opens up the possibility to place nodes also between the gateways. This requires a modification of the gateway nodes according to FIG. 8 or FIG. 9, respectively.

Figure 8:
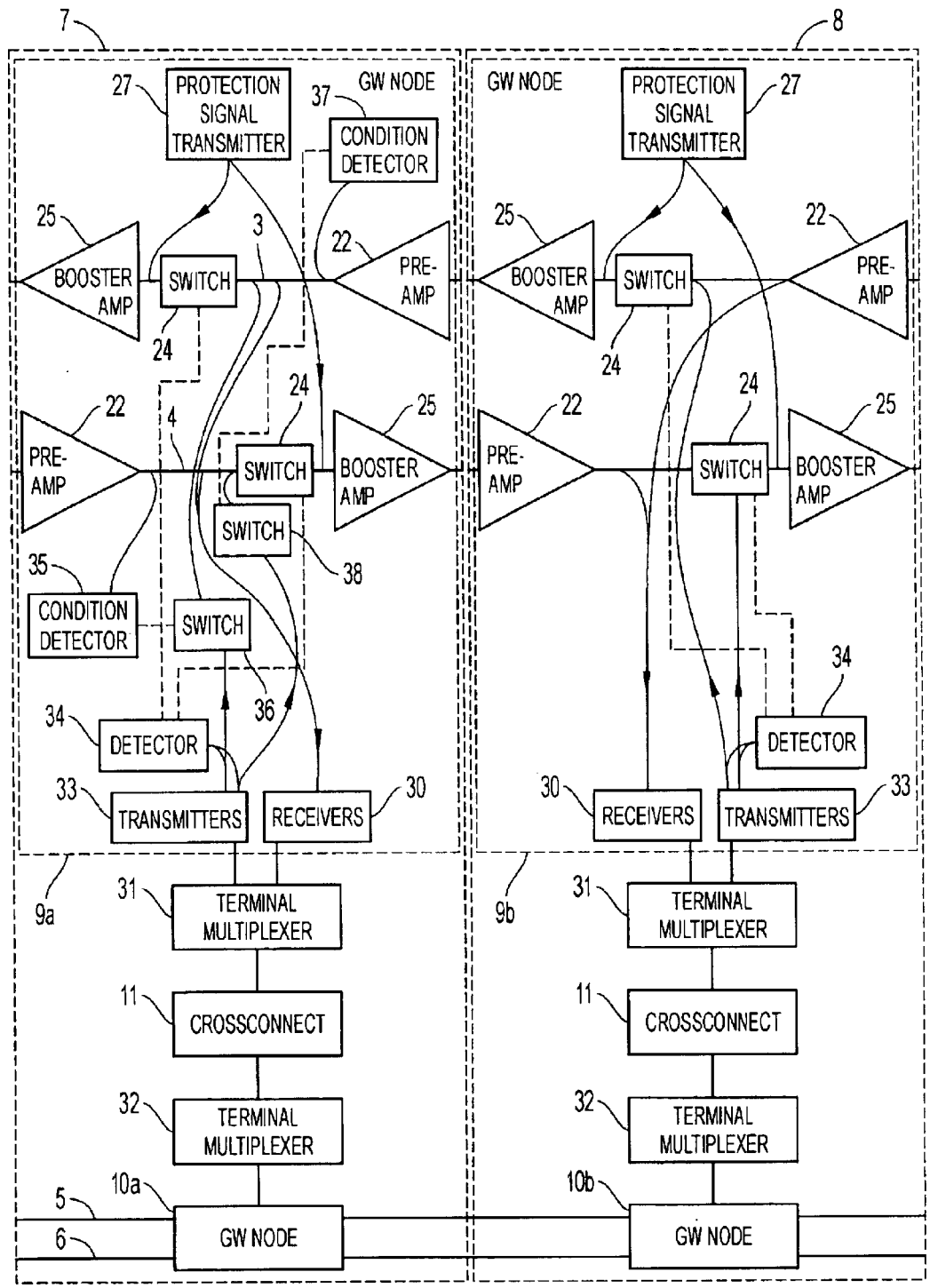
Figure 9:
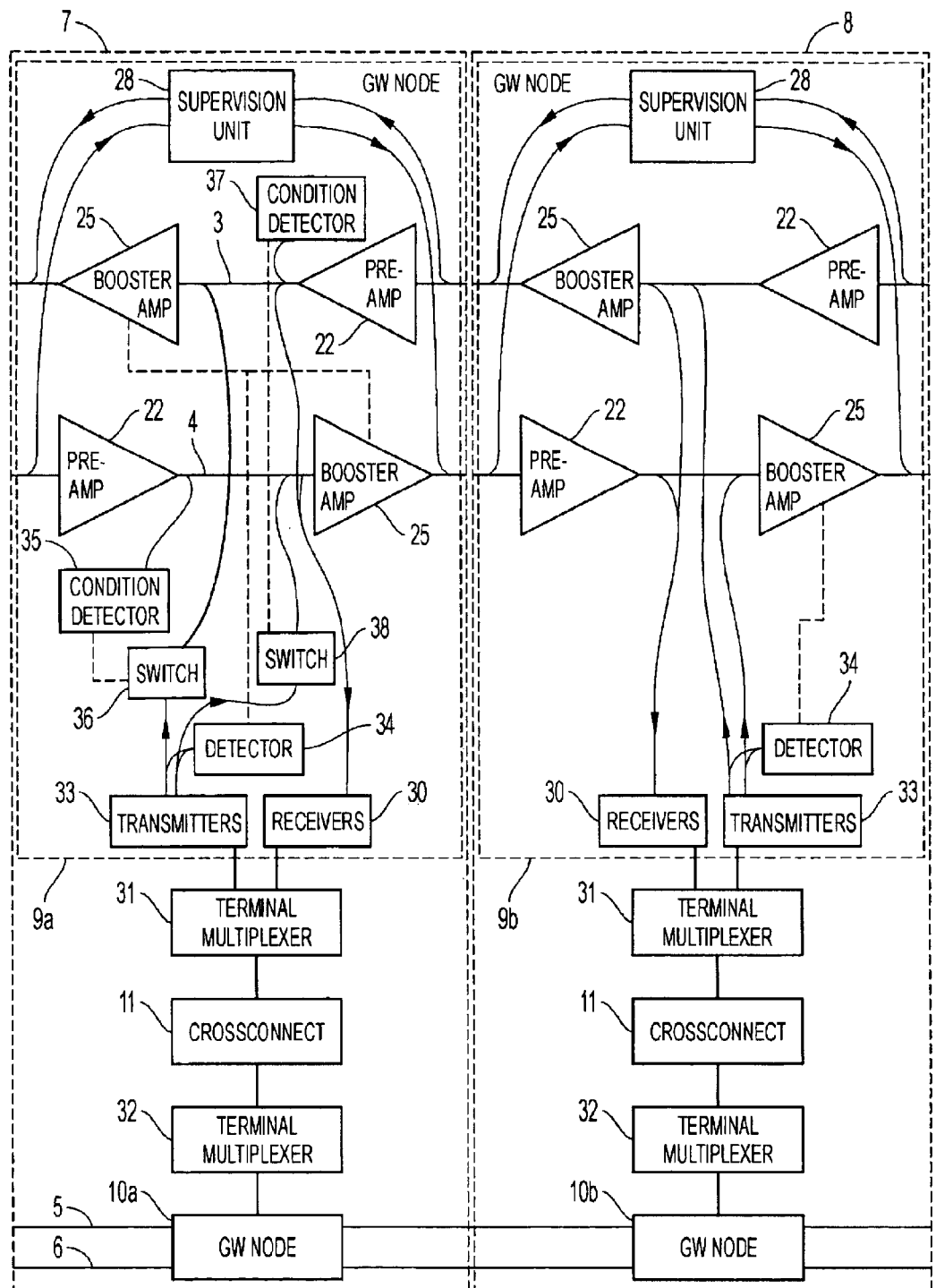

FIG. 8 is the same as FIG. 5 and FIG. 9 is the same as FIG. 6, but with additional connections which makes it possible for the gateway nodes 9a, 9b to transmit in both directions. Only FIG. 8 will be described, but FIG. 9 will work in a corresponding way. It is to be understood that in FIGS. 8 and 9 the gateways are drawn next to each other by the sole reason of lack of space on the paper. The gateways are primarily meant to be used with nodes between them.

There is a second condition detector 37, which may be the same as the other second detector 23, serving the same purpose as the condition detector 35 mentioned above, that is to put a switch 38 in an off position in the case of a discovered protection signal. Either there may be two switches 36, 38 as drawn in FIG. 8, or else one switch that switches the one transmission line or the other. In this last version, however, the left gateway will not be in standby for the right gateway.

Figure 10A:
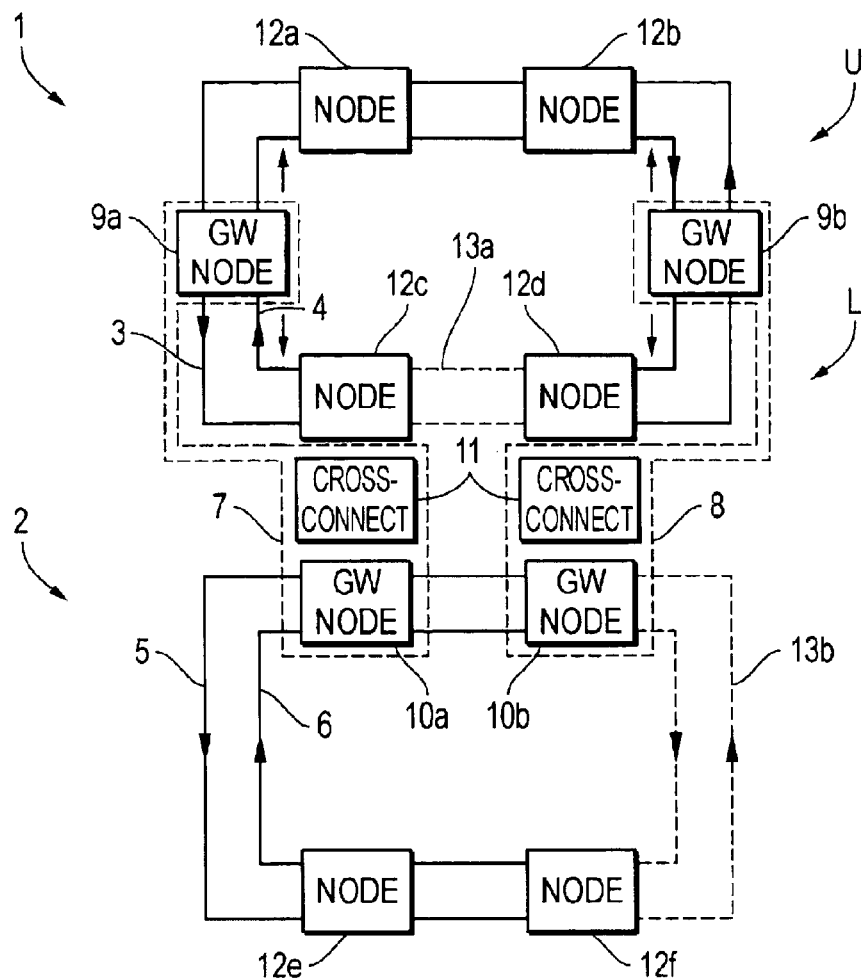
FIGS. 10a, 10b and 10c illustrates a network similar to the one in FIG. 1a, but with nodes between the gateways.
Figure 10B:
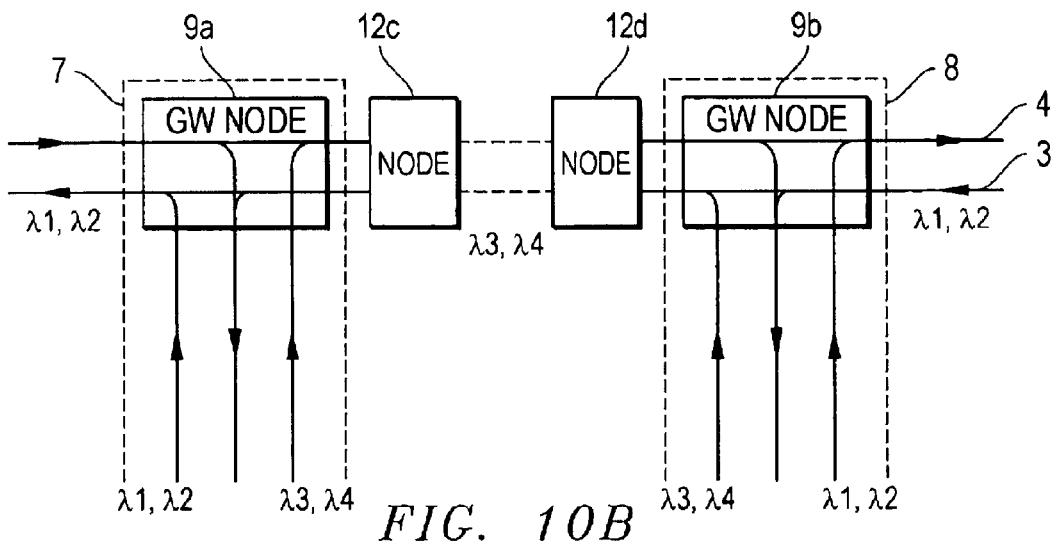
Figure 10C:
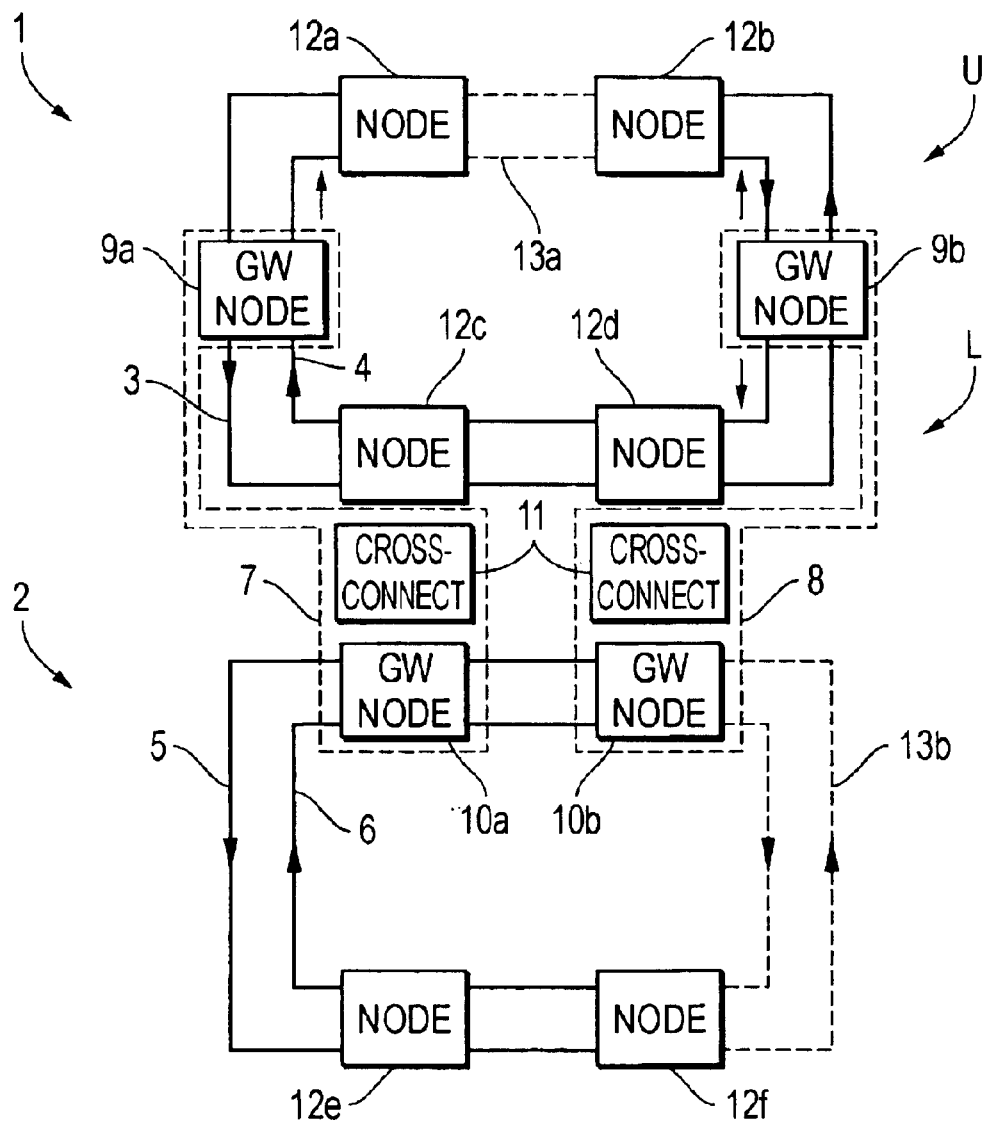

The result will be as in FIGS. 10a and 10c, which depict the same network as in FIGS. 1a, 3 and 7, but with the nodes 12c and 12d between the gateway nodes 9a, 9b instead. FIG. 10b shows how the gateway nodes work schematically.

The ring will be "separated" in an upper part U and a lower part L. "Separated" means that a gateway node 9a, 9b will in the upper part U of the ring only transmit traffic destined for the nodes in the upper part U of the ring and will in the lower part L of the ring only transmit traffic destined for the nodes in the lower part L of the ring. Note that in order to make it work properly, different wavelengths $\lambda 1, \lambda 2$ and $\lambda 3, \lambda 4$ should be used in the two parts U, L of the ring.

In FIG. 10a the inactive segment 13 is positioned between the nodes 12c and 12d in the lower part L of the ring. Hence, both gateway nodes 9a, 9b transmit in the lower part L of the ring, while only the right gateway node 9b transmit in the upper part U of the ring. This is because the left gateway 9a will detect that the right gateway node 9b is transmitting in the upper part U of the ring and thus the left gateway 9a blocks transmission in that direction.

In FIG. 10c, on the other hand, the inactive segment 13 is positioned between the nodes 12a and 12b in the upper part U of the ring. Hence, both gateway nodes 9a, 9b transmit in the upper part U of the ring, while only the right gateway node 9b transmit in the lower part L of the ring. This is because the left gateway 9a will detect that the right gateway node 9b is transmitting in the lower part L of the ring and thus the left gateway 9a blocks transmission in that direction.

In all the embodiments above, a fault occurring in one of the gateways 7, 8 gives no more problem than any other fault. Since the two gateways 7, 8 are redundant it will be like using just one gateway 7 and with an inactive segment next to the faulty gateway 8.

This method also works with more than two rings and even though only optical embodiments are shown it will work in a similar manner in an electrical network.

What is claimed is:

1. A method of maintaining operation of a signaling interconnection between a first ring network and a separate second ring network, wherein each ring network comprises two communication paths transmitting data in opposite directions and at least two nodes connected to both communication paths, wherein the first and second ring networks are interconnected via two adjacent gateways, each gateway being arranged to receive data from the two communication paths on one ring network, and to transmit the data onto the other ring network, said method comprising the steps of:

determining that a first segment between two adjacent nodes of the first network has become inactive;

creating a second inactive segment between two adjacent nodes of the second network;

transmitting data from a first node in one of the networks to a second node in the other network, wherein the first node transmits the data in a direction away from the inactive segment in the first node's network;

receiving the transmitted data in the two adjacent gateways;

transmitting the data by each of the adjacent gateways onto the other network, each of the gateways transmitting the data in a direction away from the other gateway; and receiving the transmitted data in the second node from only one of the gateways;

wherein, the inactive segment in the other network blocks the data from one of the gateways from reaching the second node.

2. The method of claim 1, wherein the step of creating a second inactive segment between two adjacent nodes of the second network includes suppressing by each of the adjacent nodes, reception from and transmission toward the direction of the inactive segment.

3. The method of claim 2, further comprising the steps of:

detecting whether a fault occurs on the ring network in a location other than in the inactive segment; and if the fault occurs on the ring network in a location other than in the inactive segment, logically moving the inactive segment to the location of the fault.

4. The method of claim 3, wherein the step of detecting whether a fault occurs on the ring network in a location other than in the inactive segment includes the steps of:

transmitting by each node, an own protection signal on both communication paths; and detecting by two adjacent nodes that a fault exists in the segment between them by detecting whether protection signals are received through the segment.

5. The method of claim 3, further comprising the steps of:

transmitting by each node, an own protection signal on both communication paths;

passing the protection signals to the inactive segment by the adjacent nodes; and detecting by the adjacent nodes whether a fault exists in the inactive segment by detecting whether protection signals are received through the inactive segment.

6. The method of claim 3, further comprising the steps of:

sending an alarm flag in an alarm channel on both communication paths from node to node;

passing the alarm flag to the inactive segment by the adjacent nodes;

detecting by the adjacent nodes whether a fault exists in the inactive segment by detecting whether the alarm flag is received through the inactive segment; and setting the alarm flag if a fault is detected.

7. A system for maintaining operation of a signaling interconnection between a first ring network and a separate second ring network, wherein each ring network comprises two communication paths transmitting data in opposite directions and at least two nodes connected to both communication paths, said system comprising:

two adjacent gateways that interconnect the first and second ring networks, each gateway being arranged to receive data from the two communication paths on one ring network, and to transmit the data onto the other ring network;

detection means in the first network for detecting whether a first segment between two adjacent nodes of the first network has become inactive;

means in the second network for creating a second inactive segment between two adjacent nodes of the second network in response to detection of the first inactive segment in the first network;

transmission means in a first node in one of the networks for transmitting data to a second node in the other network, wherein the first node transmits the data in a direction away from the inactive segment in the first node's network;

means for receiving the transmitted data in the two adjacent gateways;

means for transmitting the data by each of the adjacent gateways onto the other network, each of the gateways transmitting the data in a direction away from the other gateway; and means for receiving the transmitted data in the second node from only one of the gateways;

wherein, the inactive segment in the second node's network blocks the data from one of the gateways from reaching the second node.

8. The system of claim 7, wherein the means for creating a second inactive segment between two adjacent nodes of the second network includes means within each of the adjacent nodes for suppressing reception of data from and transmission of data toward the direction of the inactive segment.

9. The system of claim 8, further comprising:

fault detecting means in the first network for detecting whether a fault occurs on the ring network in a location other than in the inactive segment; and means for logically moving the inactive segment to the location of the fault if the fault occurs on the ring network in a location other than in the inactive segment.

10. The method of claim 9, wherein the fault detecting means includes:

means within each node for transmitting an own protection signal on both communication paths; and means for detecting by two adjacent nodes that a fault exists in the segment between them by detecting whether protection signals are received through the segment.

11. The system of claim 9, further comprising:

means for transmitting by each node in the first network, an own protection signal on both communication paths;

means within the nodes adjacent to the inactive segment in the first network for passing the protection signals to the inactive segment; and means within the adjacent nodes for detecting whether a fault exists in the inactive segment by detecting whether protection signals are received through the inactive segment.

12. The system of claim 9, further comprising:

means within each node in the first network for sending an alarm flag in an alarm channel on both communication paths from node to node;

means within the nodes adjacent to the inactive segment in the first network for passing the alarm flag to the inactive segment;

means within the adjacent nodes for detecting whether a fault exists in the inactive segment by detecting whether the alarm flag is received through the inactive segment; and means for setting the alarm flag if a fault is detected.

\* \* \* \* \*